Nov. 12, 1929.  G. KRELL ET AL  1,735,768
SPEED TRANSFORMER
Filed June 11, 1928   4 Sheets-Sheet 1
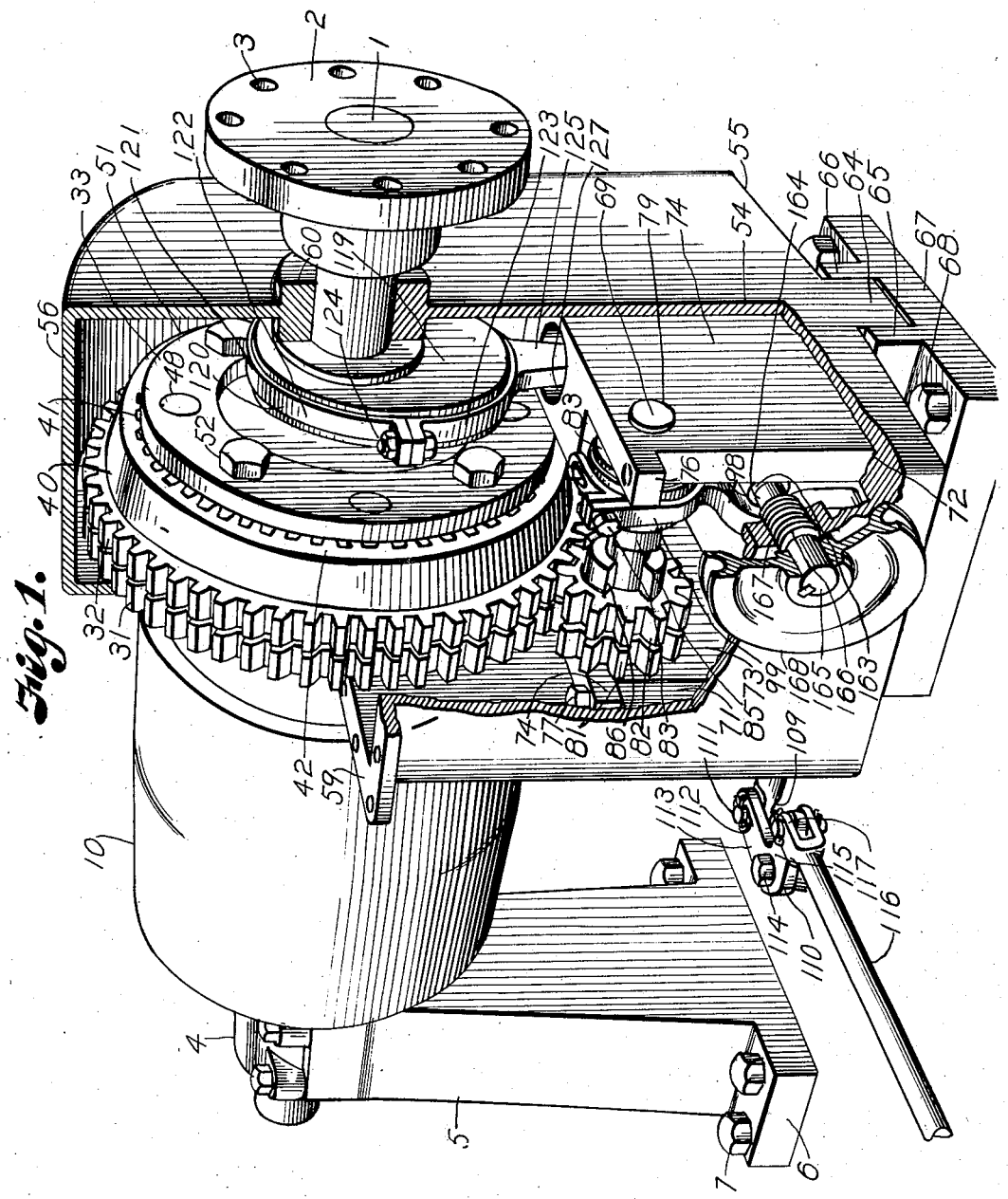
INVENTORS.
George Krell
Guy M. Martinet
BY
ATTORNEY

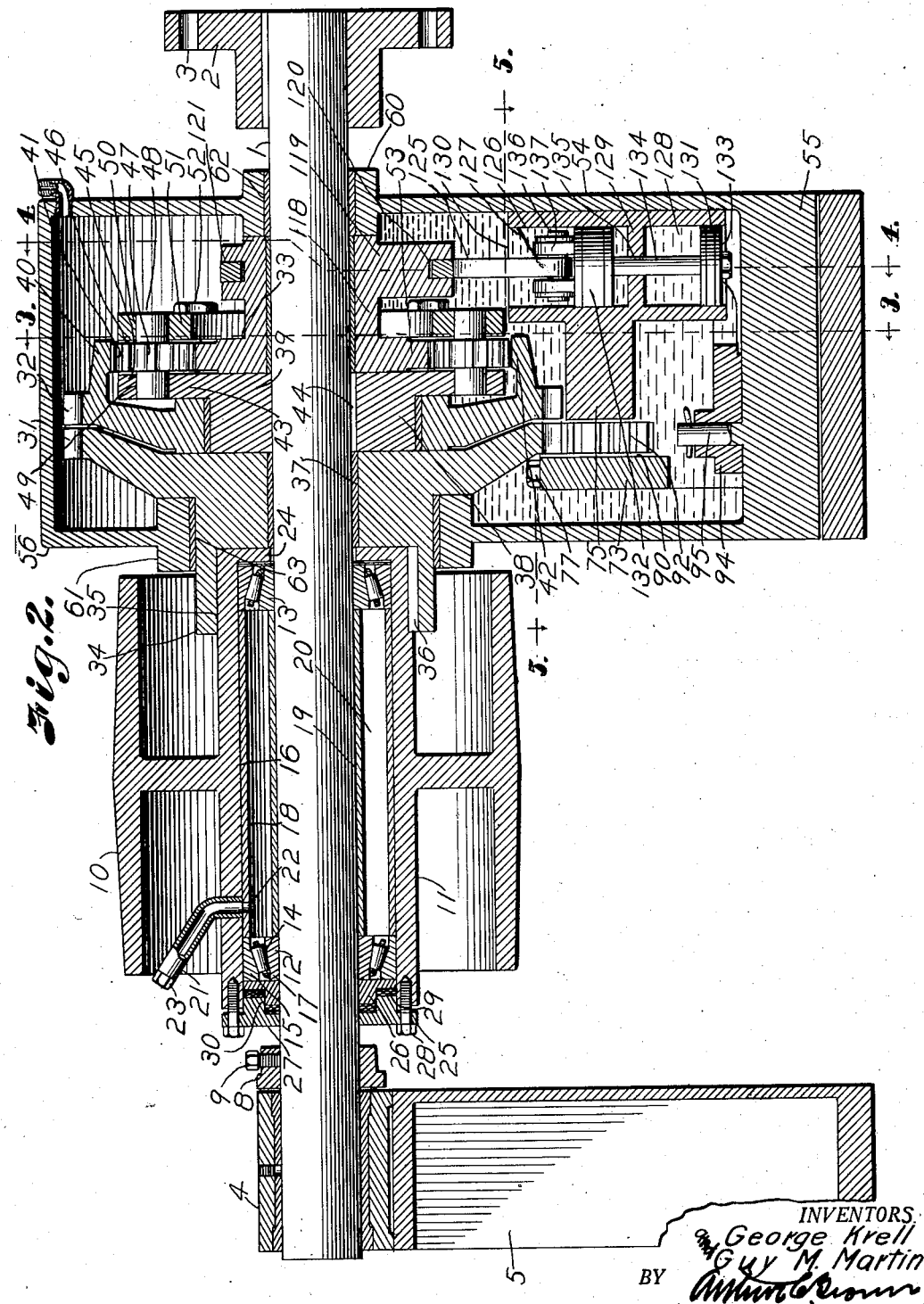

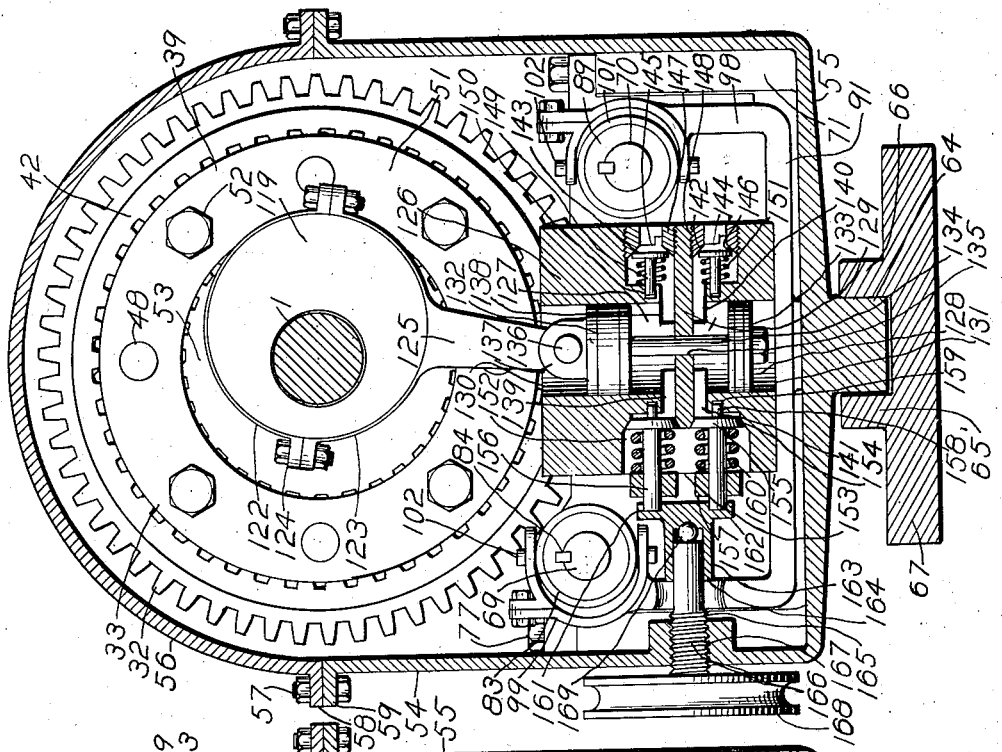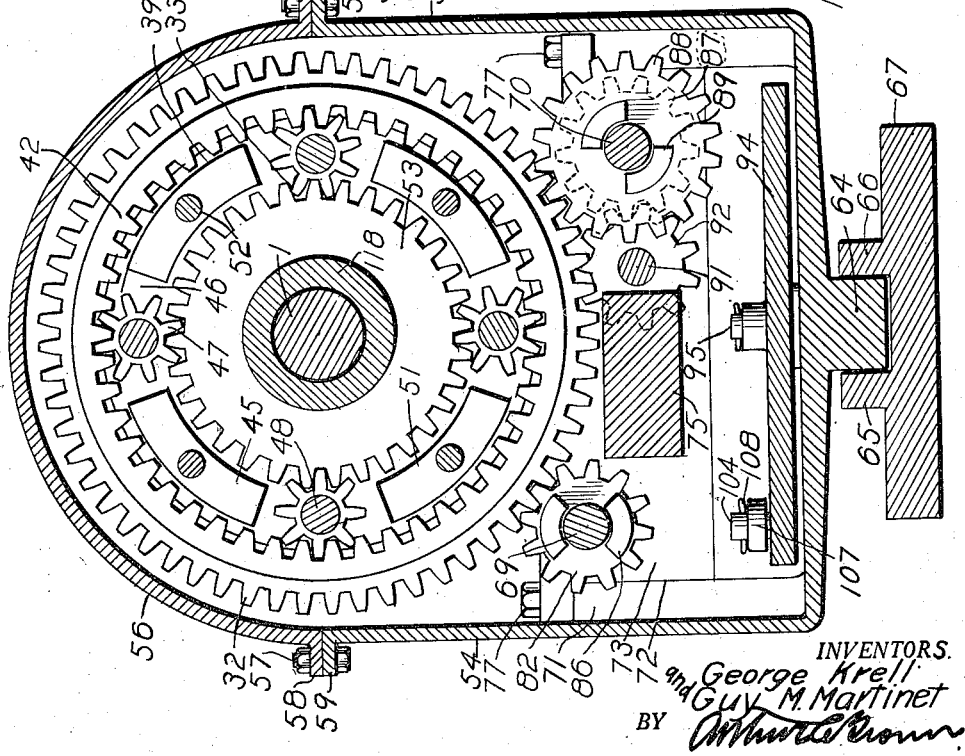

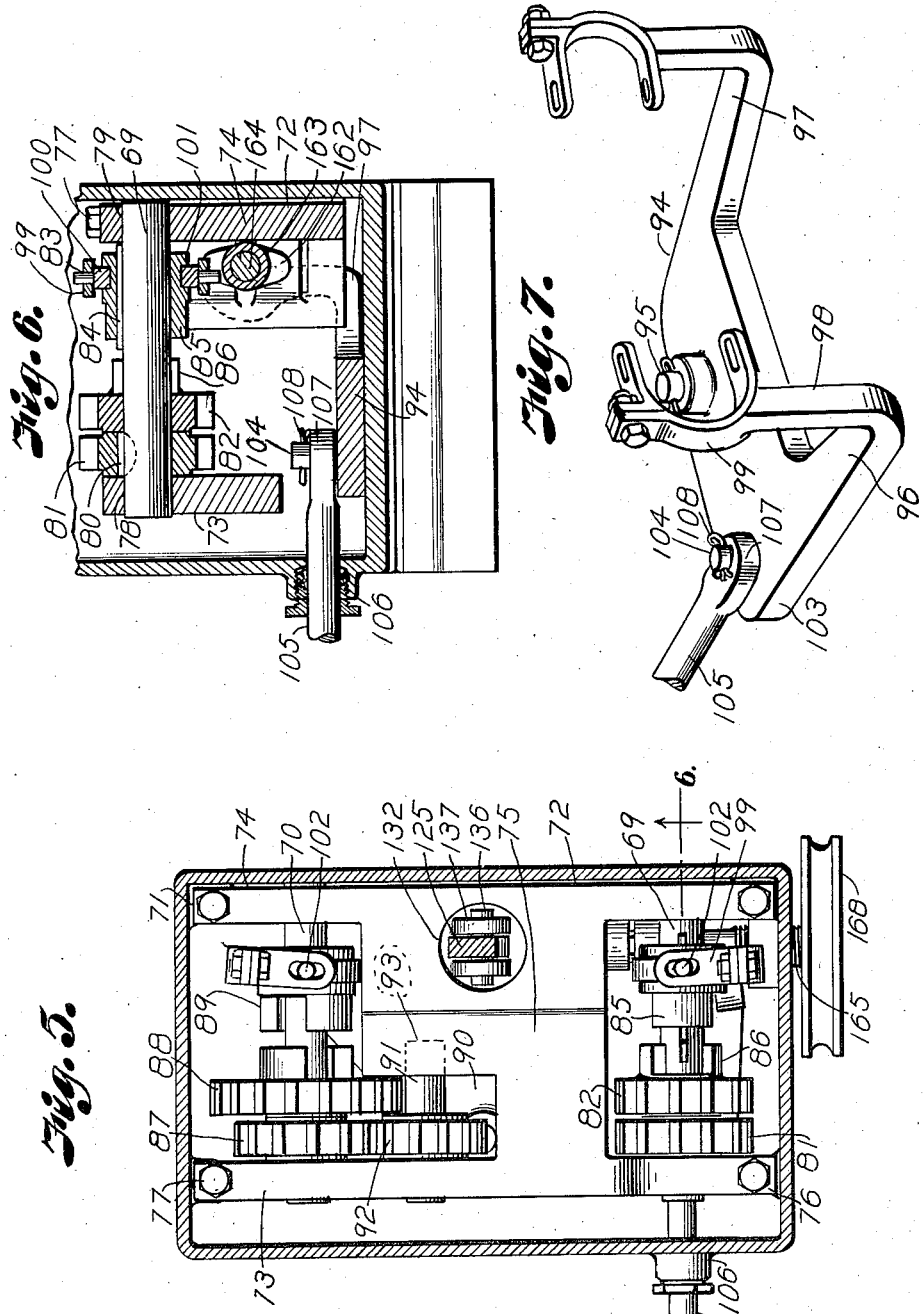

Patented Nov. 12, 1929

1,735,768

UNITED STATES PATENT OFFICE

GEORGE KRELL AND GUY M. MARTINET, OF SAPULPA, OKLAHOMA; SAID MARTINET ASSIGNOR TO SAID KRELL

SPEED TRANSFORMER

Application filed June 11, 1928. Serial No. 284,492.

Our invention relates to speed transformers and more particularly to apparatus of that character for transmitting the power of a prime mover to a working load and has for its principal objects to adapt the power to variable working loads, to allow acceleration of the prime mover to its working speed before starting the load, and to provide for gradual application of the load to the prime mover.

In accomplishing these and other objects of the invention we have provided improved details of structure, the preferred forms of which are illustrated in the accompanying drawings, wherein:

Fig. 1 is a perspective view of a speed transformer constructed according to our invention, a part of the gear housing being broken away to illustrate the speed change gearing.

Fig. 2 is a longitudinal vertical sectional view through the transformer.

Fig. 3 is a cross section on the line 3—3, Fig. 2, illustrating the planetary gearing.

Fig. 4 is a cross section on the line 4—4, Fig. 2, illustrating the sun gear controlling mechanism.

Fig. 5 is a horizontal sectional view on the line 5—5, Fig. 2.

Fig. 6 is a vertical sectional view through the lower portion of the case taken on the line 6—6, Fig. 5, and Fig. 7 is a detail perspective view of the lever plate for actuating the countershaft clutches.

Referring more in detail to the drawings:

The transformer illustrated is particularly designed for use in connection with standard oil well drilling rigs for letting in and pulling casing, tubing and tools, for pumping wells and for other hoisting purposes and in the present instance includes a shaft 1 having a flange coupling 2 keyed thereto and provided with bolt openings 3 through which bolts are extended to secure the shaft to the drive shaft of a prime mover such as an explosion engine (not shown). The shaft 1 is rotatably mounted at its free end in a bearing 4 supported in alignment with the connection to the prime mover by a bracket 5, the bracket being provided with flanged feet 6 through which bolts 7 or the like may be projected to secure the bracket to a foundation or other suitable support. An adjusting collar 8 is sleeved on the shaft adjacent the bearing 4 and secured in contact therewith by a set screw 9 extending through the collar and engaging the shaft to prevent outward longitudinal movement of the shaft in relation to the bearing.

A driven pulley 10 having a hub 11 is freely mounted on the shaft 1 on anti-friction bearings 12 and 13 at opposite ends of the hub. The bearings comprise rollers 14 running between outer races 15 that are snugly received in a bore 16 of the hub 11 and inner races 17 that are pressed on the shaft, the outer races of each bearing being spaced apart by a sleeve 18 having snug fit in the bore 16 of the hub and the inner races by a sleeve 19 on the shaft 1 so that a lubricant receiving chamber 20 is provided between the sleeves to furnish lubricant for the bearings. The lubricant is supplied to the chamber through a fill pipe 21 threaded into the hub 11 and communicating with the chamber through a port 22 in the sleeve 18 and the open end of the pipe is closed by a threaded plug 23 to retain the grease therein.

In order to prevent lubricant in the chamber from leaking out around the bearings, the inner end of the hub 11 is provided with and internally extending circular flange 24 against which the bearing 13 abuts and the outer end of the hub is closed by a stuffing box 25 comprising a washer 26 sleeved on the shaft and supported in contact with the bearing 12 by a packing plate 27 fixed to the pulley hub by machine bolts 28, suitable packing 29 being inserted between shouldered portions 30 of the washer and the plate to prevent escape of lubricant around the shaft and gland, as in common practice.

As before stated the pulley is freely mounted on the shaft but it is adapted to be driven thereby through a gear mechanism now described and which includes a driven gear 31, and a driving gear 32 actuated by the shaft through a planetary gear mechanism designated 33.

The gear 31 is rotatable on the shaft and is provided with an extended hub 34 recessed as at 35 to receive the hub 11 of the pulley 10 and is keyed thereto by a spline 36 so that when the gear is driven the pulley is rotated therewith. A bronze bushing 37 is provided for the gear at its bearing with the shaft.

The driving gear 32 is complementary to the driven gear and is rotatably mounted concentrically of the shaft and adjacent the gear 31 on the hub 38 of a planetary gear carrier 39 and is provided with a laterally extending peripheral flange 40 having internally extending teeth 41 and constitutes the orbit gear 42 of the planetary gearing 33.

The gear carrier 39 includes a disk 43 integral with the hub 38 and is keyed to the shaft by a spline 44. The disk is provided with a laterally extending peripheral flange 45 having a plurality of radially extending slots or recesses 46. Mounted in each of the slots and in meshing contact with the orbit gear is a planetary gear 47.

The gears 47 are rotatably mounted on shafts 48 extending through bearing openings 49 in the disk and similar bearing openings 50 in a keeper ring 51, which is the same diameter as the disk flange and is bolted thereto by machine bolts 52 so that the gears 47 are retained in their recesses, in meshing contact with the orbit gear, the bolts 52 being extended through the ring and threaded into the flange 45.

Rotatably mounted on the shaft 1 adjacent the disk of the gear carrier 39 and in alignment with the teeth of the planetary gears is a sun gear 53 in mesh with the planetary gears and about which the planetary gears may planetate when the gear carrier 39 is rotated by the shaft 1.

The gearing heretofore described is preferably lubricated by rotating through an oil bath contained in a housing 54 which also incloses the gearing and comprises base and cover members 55 and 56 respectively which are of suitable size to enclose the gearing and are secured together by bolts 57 which extend through mating flanges 58 and 59 on the said members. The shaft 1 extends through a bearing 60, half of which is formed in the cover 56 and the other half in the base 55 in one side of the housing and the hub extension 34 of the gear 31 extends through a bearing 61 formed in the opposite wall, the bearings being provided with bearing sleeves 62 and 63 respectively.

The housing is preferably loosely mounted on the shaft and in order to prevent rotation of the housing the base member 55 is provided with a downwardly projecting tongue 64 extending across the bottom thereof parallel with the shaft and the tongue 64 engages between spaced ears 65 and 66 projecting upwardly of an anchor plate 67 which is bolted to the fundation by bolts 68. Thus the housing has floating relation to the shaft so that the housing will not bind the shaft which, with this construction, is supported only at its ends.

The drive gear 32 is adapted to drive the pulley gear 31 in forward and reverse directions through countershafts 69 and 70, now described. Bolted to lugs 71 projecting inwardly of the housings adjacent its corners on opposite sides of the base member is a countershaft supporting block 72 comprising spaced plates 73 and 74 extending crosswise of the housing and spaced apart by a connecting web designated 75, the plates being provided with ears 76 projecting over the lugs and through which bolts 77 are projected into the lugs to secure the block within the housing.

The countershafts 69 and 70 are rotatably mounted in aligning bearing openings 78 and 79 in the plates so that the countershafts extend parallel with the shaft 1. Fixed to the countershaft 69 by a key 80 and in mesh with the pulley gear is a pinion 81 and loosely mounted on the shaft adjacent the gear 81 is a second pinion 82 meshing with the driving gear 32 and which is adapted to drive the countershaft through a clutch collar 83.

The clutch collar is slidably keyed to the shaft by a key 84 and is provided with jaws 85 for engaging between complementary jaws 86 on the pinion. Thus when the clutch collar is moved into clutching engagement with the pinion 82, the pinion, being in mesh with the driving gear, will drive the counter shaft and, of course, the pinion 81 will drive the pulley gear 31 and cause the pulley to rotate at the speed of the driving gear 32 and in the same direction.

The other counter shaft 70 is provided for reversing the direction of rotation of the pulley and it has a fixed pinion 87 complementary to the pinion 81 on the other counter shaft and which is in alignment with the pulley gear but not in driving contact therewith. The reversing counter shaft 70 is driven to rotate the pinion 87 by a gear 88 meshing with the driving gear 32 and which is adapted to drive the shaft through a clutch collar 89 complementary to the collar 83 on the other shaft. The block is provided adjacent the pinion 87 with a recess 90 and rotatably mounted therein on a shaft 91 is a gear 92 meshing with the pulley gear 31 and with the pinion 87 on the reverse counter shaft, one end of the shaft being mounted in the plate and the other in a bearing 93 formed in the web 75 of the block. Thus when the clutch 89 is in engagement with the gear 88 the drive gear 32 rotates the counter shaft, and, the pinion 87 meshing with the gear 92 drives the pulley gear 31 in reverse direction to that of the driving gear 32.

Since the clutch collars engage their pinions independently of each other, we have provided a common actuating means for both of the clutch collars which includes a plate 94 pivoted on a pintle 95 extending upwardly from the bottom of the case midway between the clutch collars and adjacent the opposite side of the case therefrom, so that the plate may be rocked thereon to move a pair of actuating arms 96 and 97, each extending to adjacent a clutch collar 83 and 89 and are provided with vertical arms 98 carrying yokes or forks 99 which engage rings 100 seated in peripheral grooves 101 formed in the clutch collars, the yokes being connected with the collars by pins 102. One corner 103 of the plate 94 (Fig. 7) is provided with a pin 104 for connection with a sliding rod 105 for rocking the plate on its pivot 95. The rod 105 projects through a stuffing box 106 on the side of the case and is provided on its inner end with an eye 107 which engages the pin and is locked thereon by a cotter pin 108 extending through the pin above the eye. The outer end of the rod is flattened, as at 109, and apertured for connection with the arm of a bell crank lever 110, the connection comprising a pin 111 extending through the rod and through a slot 112 in the arm 113 of the bell crank to permit swinging movement of the arm, and sliding longitudinal movement of the rod. The bell crank is pivotally mounted to the base or foundation by a stud bolt 114 and the other arm 115 of the lever is connected to an actuating rod 116 by a pin 117 so that when the bell crank lever is rocked in an anti-clockwise direction, the plate is rocked on its pivot to move the clutch 83 into engagement with its pinion 82 to rotate the pulley in a forward direction and when the bell crank is moved to its extreme position in a clockwise direction, the clutch 83 is disengaged and the reverse clutch 89 is engaged to drive the pulley in reverse direction. When the actuating plate is moved to a position intermediate to the two positions just mentioned, both clutches are disengaged and are in neutral position so that the pulley is disconnected from driving relation with the driving gear 32.

With the structure thus far described, when the drive gear 32 is under load of the pulley and the shaft is rotated, the planetary gear carrier 39 will be rotated therewith and cause the planetary gears 47 to idly planetate within the orbit gear 42 without rotating the driving gear 32, since the planets in their revolution will drive the sun gear 53 idly on the shaft without imparting rotation to the orbit gear; consequently, the rotation of the pulley is zero. It is also a fact that should resistance be applied to stop rotation of the sun gear 53, the planetary gears 47 will impart their driving force to the orbit gear 42 and rotate the orbit gear at its maximum speed to cause the pulley to rotate at its maximum speed in either forward or reverse directions, depending on whether or not the clutch 83 or 89 is engaged with its pinion. Thus zero and maximum speeds of the pulley are provided, and by controlling the speed of the rotation of the sun gear between its maximum and zero speeds, we are enabled to obtain a uniform variable speed of the pulley between its maximum and zero speeds, as now described.

The sun gear 53 is provided with an extended hub 118 and cast integral with the hub is an eccentric disk 119 having a peripheral groove 120 to receive an eccentric yoke 121. The yoke comprises two strap-like portions 122 and 123 extending in the groove 120 and which are bolted together, as at 124. The member 123 has a depending arm 125 for driving a hydraulic pump 126 for controlling speed of rotation of the sun gear.

The pump is of the double action type including an upper cylinder 127 and a lower cylinder 128 bored from opposite sides of the block to provide a separating partition 129 between the cylinders. The respective cylinders are open at their upper and lower ends 130 and 131 and are provided with pistons 132 and 133 connected together by a rod 134 extending through a bearing opening 135 formed in the partition 129 so that the pinions are connected in tandem and actuated in unison by the eccentric arm 125, the eccentric arm being connected to the upper piston 132 by a wrist pin 136 which extends through spaced ears 137 formed on the head of the piston and through an aperture in the end of the eccentric arm 125, the arm engaging the wrist pin between the ears as best shown in Fig. 2.

Each cylinder is provided with inlet and outlet ports 138—139 and 140—141, respectively, located in the cylinder walls at opposite sides of the partition 129.

The intake ports 138 and 140 communicate with inlet valve chambers 142 formed in the block and in which are mounted automatically actuated valves 143 and 144, the valve for the upper cylinder being adapted to open by suction on the upstroke of the pistons and the valve 144 adapted to open on the downstroke of the pistons so that a charge is drawn into the upper cylinder on the upstroke and into the lower chamber on the downstroke. The valves are of the poppet type and comprise valve heads 145 seating on beveled seats 146 formed in bushings 147 which are screwed into threaded openings 148 formed in the block and communicating the valve chambers with the interior of the gear housing. The valves also include stems 149 which are slidable in a bore 150 in the block and a spring 151 sleeved over the stem engages the wall of the valve chamber and the head of the valve to hold the valves closed on the compression strokes of the pistons.

The outlet ports 139 and 141 are located diametrically opposite to the intake ports and communicate with a common valve chamber 152 having outlet opening 153 to the interior of the housing. The valve chambers adjacent the ports 139 and 141 are provided with valve seats 154 to seat outlet valves 155 which are mounted on valve stems 156 slidingly mounted in bridges or bars 157 extending across the outlet opening 153. The valves are provided with reduced concentric extensions 158 which are slidably received in bearing recesses 159 formed in the end walls of the valve chambers to retain and center the valves concentric with their seats.

The valves 155, like the valves 143 and 144, are of the automatic type and are normally held in closed position by compression springs 160 coiled about the valve stems with one end bearing against the bridge and the other against its valve.

Thus it is apparent that when the sun gear is rotated the pistons will be operated in their cylinders, one pumping oil from the gear housing through the intake port on the upstroke and discharging it through the outlet port back into the housing on the downstroke and the other piston draws in a charge through its intake port on the downstroke and discharges it through its outlet port on the upstroke so that when one piston is drawing in a charge, the other is discharging. Thus the pistons equally oppose each other so that uniform resistance is offered to the rotation of the sun gear and the pistons operate similar to a hydraulic stabilizer to prevent fluctuations in rotation of the sun gear.

Normally the outlet valves 155 open a sufficient distance to permit free flow of fluid through the pump and minimum resistance is offered to rotation of the sun gear so that when the pulley is under load, its rotation is zero. However, should the outlet ports be restricted by limiting the opening of the exhaust valves, the liquid being forced through the reduced outlets offers resistance to the pistons to slow down rotation of the sun gear. This resistance to rotation of the sun gear causes a corresponding increase in rotation of the orbit gear since the power is then transferred thereto and the pulley is driven at an increased speed from zero.

Should the opening of the valves be further restricted the resistance to the sun gear is increased and the speed of the pulley is correspondingly increased, and should the valves be restrained from opening so that fluid could not get out of the exhaust ports, the pistons cannot move as the liquid is substantially non-compressible and since the inwardly opening inlet valves are closed, the sun gear cannot rotate and all the driving power is imparted to the orbit gear and the pulley is rotated at its maximum speed. Thus the speed of the pulley may be uniformally regulated from zero to its maximum by controlling discharge of the pump through controlling the degree of the exhaust valve opening.

To accomplish this object we have provided mechanism for uniformly limiting opening of the valves from full open to full closed position and vice versa, as now described.

The valve stems 156 protrude through the bridges 157 and their ends are seated in recesses 161 formed in the face of a valve abutment plate 162 which is provided with a bored hub 163 on its opposite face which is supported on an extension 164 of an adjusting screw 165.

The adjusting screw is threaded as at 166 through an opening 167 in the side of the housing and carries on its projecting outer end an actuating wheel 168 by which the wheel may be rotated to thread the screw into and out of the case for positioning the abutment plate against the valve stems to control opening of the outlet valves. That is when the adjusting screw is projected into the case the extension 164 bears against the plate 162 and the plate bears against the ends of the valve stems to hold the valves on their seats so that they cannot open but as the adjusting screw is slacked off, the valves are gradually permitted to open. A ball bearing 169 is preferably mounted in the bore of the hub 163 between the end of the screw extension and the abutment plate to reduce friction of the screw bearing on the plate.

The operation of a transmission constructed as described is as follows: In operating the pulley in a forward direction, the bell crank 110 is moved to cause the rod 105 to swing the plate 94 on its pivot 95 to move the clutch collar 83 into engagment with the pinion 82 and as soon as the sun gear encounters resistance of the pump the driving gear will start to rotate the counter-shaft. The wheel 168 is rotated to gradually restrain opening of the outlet valves of the pump which gradually retards the sun gear to cause a gradual increase in speed of the orbit gear and the pulley speed is gradually increased until the outlet valves are finally restricted from opening, whereupon the pulley has then obtained its maximum speed.

Thus the pulley speed is gradually increased from zero to its maximum, allowing the load to be gradually applied to the engine and providing a smooth easy start of the load without materially reducing the engine speed.

To operate the transmission in reverse the bell crank is moved in the opposite direction to disengage the clutch 83 and engage the clutch 89 with its pinion which reverses direction of the pulley gear.

Neutral position is obtained by disconnecting the clutches 83 and 89 so that the pulley gear is out of driven connection with the driving gear 32 and the gear 32 will rotate idly without the sun gear driving the pump.

What we claim and desire to secure by Letters Patent is:—

1. In a speed transformer, a driving shaft, a planetary gear carrier fixed to the shaft, a sun gear loosely mounted on the shaft, a planetary gear carried by the gear carrier and meshing with the sun gear, a driven member, a driving gear, means operatively connecting the driving gear with the driven member, an orbit gear on the driving gear, and means actuated by the sun gear for regulating speed of the orbit gear to vary speed of the driven member.

2. In a speed transformer, a driving shaft, a driven member rotatably mounted thereon, a driven gear fixed to the driven member, a driving gear complementary to the driven gear, an orbit gear carried by the driving gear, a planetry gearing actuated from the driving shaft for rotating the orbit gear, a sun gear meshing with the planetary gearing, means for controlling rotation of the sun gear to vary the speed of the orbit gear, a counter shaft, and gears on the counter shaft meshing with the driven and driving gears respectively to actuate the driven member.

3. In a speed transformer, a driving shaft, a driven member rotatably mounted thereon, a driven gear fixed to the driven member, a driving gear complementary to the driven gear, an orbit gear carried by the driving gear, a planetary gearing actuated from the driving shaft for rotating the orbit gear, a sun gear meshing with the planetary gearing, means for controlling rotation of the sun gear to vary the speed of the orbit gear, a counter shaft, gears on the counter shaft meshing with the driven and driving gears respectively to actuate the driven member, and a clutch for controlling one of the counter shaft gears.

4. In a speed transformer, a driving shaft, a driven member rotatably mounted thereon, a driven gear fixed to the driven member, a driving gear complementary to the driven gear, an orbit gear carried by the driving gear, a planetary gearing actuated from the driving shaft for rotating the orbit gear, a sun gear meshing with the planetary gearing, means for controlling rotation of the sun gear to vary the speed of the orbit gear, and means between the driving gear and the driven gear for reversing the driven member.

In testimony whereof we affix our signatures.

GEORGE KRELL.
GUY M. MARTINET.